Nov. 30, 1948.　　　T. C. HILL ET AL　　　2,455,334
CONSTANT VOLUME EXPANSIBLE BRAKE LINE

Filed Dec. 30, 1944　　　　　　　　　　　　2 Sheets-Sheet 1

*INVENTOR.*
THOMAS C. HILL &
WILLIAM A. SCHMIDT
BY

*Donald W. Farrington*
ATTORNEY

Nov. 30, 1948.    T. C. HILL ET AL    2,455,334
CONSTANT VOLUME EXPANSIBLE BRAKE LINE
Filed Dec. 30, 1944    2 Sheets-Sheet 2

INVENTOR.
THOMAS C. HILL &
WILLIAM A. SCHMIDT
BY
Donald W. Farrington
ATTORNEY

Patented Nov. 30, 1948

2,455,334

UNITED STATES PATENT OFFICE 2,455,334

CONSTANT VOLUME EXPANSIBLE BRAKE LINE

Thomas C. Hill, Parkville, and William A. Schmidt, Middle River, Md., assignors to The Glenn L. Martin Company, Middle River, Md., a corporation of Maryland Application December 30, 1944, Serial No. 570,680

1 Claim. (Cl. 244—111)

Our invention relates to hydraulic lines and more particularly to a high pressure, constant volume, variable length, brake line.

Modern design of aircraft tends toward minimizing the structure and equipment weight in order that the aircraft may be more efficient from the point of view of load carried, whether payload cargo or military load and equipment. One way of accomplishing this object is the skeletonizing of structure and the decreasing of the size of equipment. In hydraulic equipment, considerable weight can be saved if higher pressures are used. The same motive force can be obtained with high pressures and smaller area pistons as may be obtained from low pressures and large area pistons.

A further advantage in the use of higher pressures in equipment employing hydraulic cylinders is that greater forces and loads may be effected without undesirable increases in the bulk of the equipment.

The increase in pressure in hydraulic equipment creates a relatively minor problem as to the development of rigid metal tubing and cooperating fittings capable of meeting the demands for systems operating at pressures of 1500 to 3000 lbs. per sq. inch. However, this is not true of lines or conduits that are made flexible to provide for movement in various planes relative to the supporting structural parts. For example, the hydraulic brake lines on airplane landing gear equipped with oleo struts must be so constructed as not to interfere with the motion of the oleo strut.

The proper application of the brakes depends upon a controlled pressure that is not influenced by any other force than that applied by the pilots' foot on the brake pedal. It is essential that the volume of fluid in the line remain constant as controlled by the pilot, otherwise, the brakes, when used to stop a landing airplane, will grab, placing the plane beyond the control of the pilot which might cause a disastrous ground crack-up.

In hydraulic equipment employing flexible fluid lines it is essential to maintain the pressure in the line constant, and free from variations due to the flexing of the lines changing the fluid volume, for smooth and steady applications of power to the load so as to eliminate jerky movement and chatter in the equipment.

Various unsuccessful attempts have been made to adapt flexible hose or tubing of the customary type to meet these exacting requirements. This type of tubing is ordinarily composed of materials, certain of which in addition to their being flexible are characterized by their high degree of elasticity. This inherent elasticity allows for considerable expansion in fluid volume capacity when subjected to high pressures. The variance of the volumetric content of a flexible elastic tube may not be disastrous when such equipment is operated at low pressures, but such variance may be fatal when operated at high pressures.

Our invention provides a constant volume variable length fluid line consisting of a plurality of concentric tubular members connected with universally mounted fluid tight fittings, said tubular members being constructed and arranged so that a fluid therein under pressure can be maintained at a constant volume irrespective of the pressure variation or movement of the parts.

It is among the objects of our invention to provide a flexible hydraulic line having movable inelastic parts capable of being operated at high pressures with no variation in its volume content. By a flexible hydraulic line is meant a tubular conductor of fluid in which the points of inlet and outlet are capable of movement over a varying range of relative movement one to the other. In the flexible line of our invention all recess areas are metallically enclosed and non-changing in volume irrespective to their position.

Another object of our invention is to provide a constant volume inelastic hydraulic brake line satisfactorily operable at high pressures.

A further object of our invention is to provide a metalic hydraulic brake line that will not deteriorate with age nor temperature variation encountered under ordinary operating conditions.

A further object of our invention is to provide an inexpensive type of sliding variable length constant volume connection provided with fluid tight seals for use in conveying fluids of high hydraulic pressures. The arrangement of the parts of our invention is such that it is well suited to the use of self-adjusting seals which provides for long life leak-proof joints with freedom from costly seal adjustments or repairs.

It is a further object of our invention to provide a brake line or fluid pressure conduit according to the preceding objects wherein a fixed volume tube is concentrically arranged within a fixed volume chamber and in communication therewith so that relative longitudinal movement between the tube and chamber effects no volume change in the fluid path through the tube and chamber.

Further objects and advantages of the invention will appear more fully from the description, particularly when taken in conjunction with the accompaning drawings which form a part hereof.

Similar numbers refer to similar parts throughout the drawings.

Figure 1:
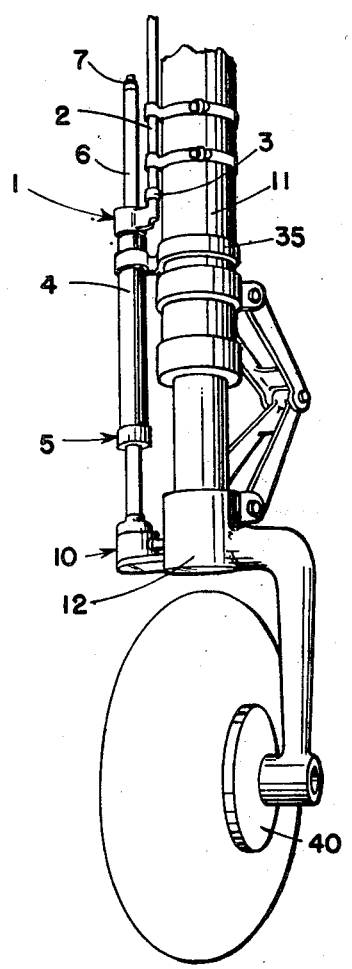
Figure 1 is a perspective view of the hydraulic brake line of our invention installed on an oleo strut of an airplane.
Figure 2:
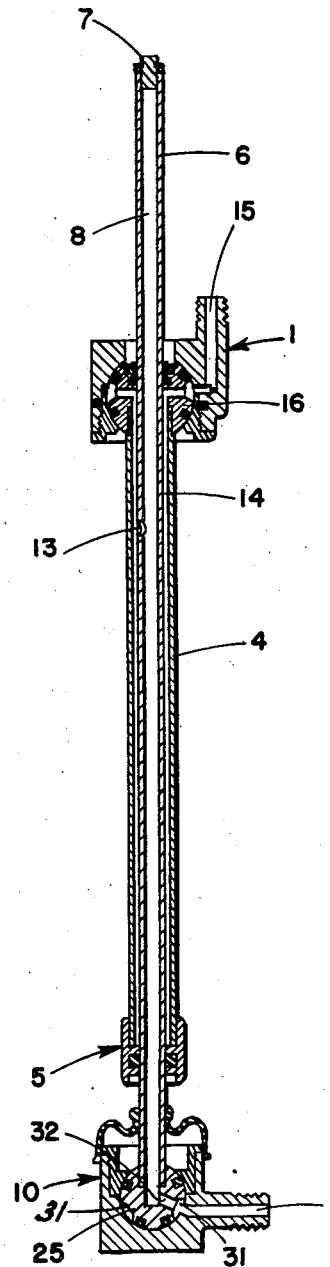
Figure 2 is a sectional view of the hydraulic brake line showing the essential features to illustrate its operation.
Figure 3:
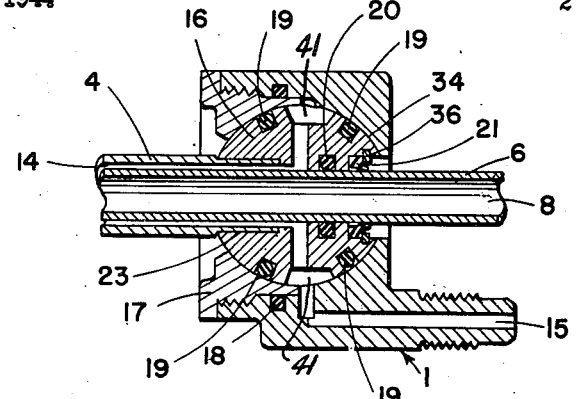
Figure 3 is an enlarged sectional view of the one end of the hydraulic brake line.
Figure 4:
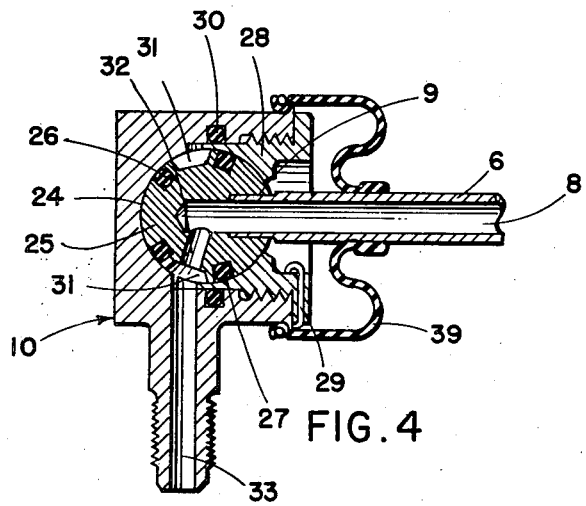
Figure 4 is an enlarged sectional view of the other end.

Referring to Figure 1 we have illustrated the hydraulic brake line of our invention in its preferred embodiment, in the form of a flexible hydraulic connection installed on the oleo strut of an airplane landing gear. The unit is attached by means of a band 35 or the like to the supporting structure 11 which in this case is the upper member of the hydraulic shock absorber or oleo strut and the fitting 1 is connected to the rigid pipe 2 of the hydraulic brake system by a conventional fitting 3. The connection between the rigid pipe 2 and the lower end of the strut includes outer and inner tubular members 4 and 6 respectively. One end of the outer tubular member 4 is secured to the ball 16 positioned in a spherical recess in the body of fitting 1 as shown in detail in Figure 3. The other end of said outer tubular member 4 is secured within the slidable intermediate connection 5. The inner tubular member 6, which is smaller in outside diameter than the inside diameter of the outer tube 4, is provided with a plug 7 fitted to the upper end so as to completely seal the upper end of tube 6 (see Figure 2) to form a fluid chamber 8. The lower or opposite end of tube 6 is formed to fit into the socket 9 (Figure 4) in the ball 25 of swivel fitting 10 mounted on the lower part 12 of the oleo strut as illustrated in Figure 1. The inner tube 6 is formed with an orifice 13 (Figure 2) in the wall of its midsection to allow the free passage of fluid between the annular chamber 14, formed between the outer and inner tubular members 4 and 6, and the cylindrical chamber 8 of the inner tube 6.

To lead fluid pressure into the annular chamber 14 a passage 15 is formed in the fitting 1 extending from its exterior to the annular groove 41 and thence through the cooperating ball 16, thereby providing for the free flow of fluid from a fluid pressure source through the rigid tube 2. The end of the outer tube 4 is rigidly secured in socket 23 (Figure 3) of the ball 16 held in place by retainer 17 hydraulically sealed by an O ring, or like, seal 18. The ball 16 formed to allow relative movement between fitting 1 and tube 4 is provided with O ring, or like, seals 19 spaced at each side of groove 41 positioned around the periphery of the ball 16. These seals provide fluid tight sealing means for the operating fluid irrespective of the relative movement of ball 16 in socket 34. An O ring, or a like, seal 20 and a wiping ring 21 are positioned inside of ball 16 so as to surround the inner tube 6 and provide a slidable fluid tight seal between said inner tube 6 and interior of the ball 16. The wiping ring 21 is held in place by a snap ring 36, or the like.

Figure 5:
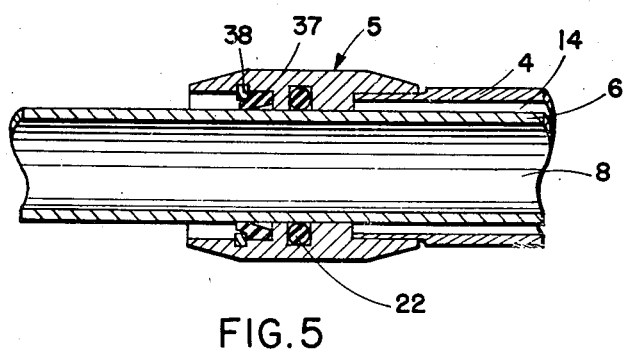
Figure 5 is an enlarged sectional view of the slidable intermediate connection.

A slidable fitting 5 (see Figure 5) of conventional design is rigidly affixed to the end of the outer tube 4 and is formed to slide over inner tube 6 with an O ring, or like, seal positioned around the inside periphery thereof to form a slidable fluid tight seal 22 between the end of said outer tube 4 and said inner tube 6 providing the annular chamber 14. A wiping ring 37 is placed at the end of fitting 5 adjacent seal 22 and maintained in position shown by annular retainer ring 38.

The open end of the inner tube 6 is rigidly secured in socket 9 within ball 25 (see Figure 4) mounted for movement within socket 24 of swivel fitting 10. Said ball 25 is formed with O ring, or the like, seals 26 and 27 placed around its periphery so as to provide fluid tight seals between the ball 25 and its socket 24 when held in place by ball retainer 28 locked in position by locking wire 29. The ball retainer 28 is provided with a seal 30 poistioned to hydraulically seal said ball retainer 28 against the pressure of fluid in passage 31 extending around ball 25. The passage 32 communicates with chamber 8 of the tube 6 and passage 31. A passageway 33 leads fluid pressure from passage 31 to the brake cylinder (not shown). A flexible covering boot 39 is preferably placed over the open end of fitting 10 to exclude dirt and moisture.

It has been found that seals placed as afore described hydraulically seals the brake fluid against loss even when subjected to extremely high pressures and yet permits free movement between the respective parts.

The ball and socket assemblies are important to the operation of our invention on an oleo strut of an airplane where the type of landing gear involves turning the landing wheel 90° about the axis of the strut when retracted so that the wheel is coplanar with the undersurface of the wing. It will be understood, however, that the invention is adaptable to other applications involving different ranges of movement.

The operation of the device is as follows: Upon the pilot's actuation of the brake pedal in the conventional system fluid pressure from the hydraulic system enters passage 15 in fitting 1. This fluid pressure is transmitted through the passages in ball 16 to the annular chamber 14. Inner chamber 8 of tube 6 is in communication with chamber 14 through orifice 13. The fluid pressure in the chamber 8 is transmitted through passages 32 and 33 to the hydraulic line that communicates with the usual brake mechanism (not shown) on the landing gear wheel 40. The entire system from passage 15, groove 41, chamber 14, chamber 8 and passages 31, 32 and 33 is filled with hydraulic fluid. The annular groove or passage 31 is proportioned so as to span an arc exceeding the diameter of passage 33 so as to permit full free flow of fluid pressure while accommodating angular movement of the ball 25 within the fitting 10. The groove 41 in ball 16 is similarly formed. The volume of hydraulic fluid in the portion of the brake line from passage 15 to passage 33 is definite and constant because the intervening spaces of predetermined volumes are completely filled. It will also be noted that tube 4 may slide relative to tube 6 so that the spaced relationship of fitting 1 carrying passage 15 may be varied relative to fitting 10 carrying passage 33, but the volume of hydraulic fluid present in the system described above is not changed, nor is it subjected to any pressure occasioned by the relative motion of the inlet and outlet. Thus the line of our invention is free of any fluctuation in the pressure of the hydraulic fluid contained in the closed system. Tubular member 4 may be positioned anywhere along tube 6 as long as orifice 13 remains within the length of tube 4 between the seals on the ends thereof and thus fluid pressure will be transmitted unchanged from passage 15 to passage 33.

While we have described herein the preferred embodiment of our invention we wish it to be understood that we do not intend to limit ourselves thereby except within the scope of the appended claim.

We claim as our invention:

In a hydraulic braking system comprising a slidable unit having a movable fluid tight fitting formed with an aperture and provided with sealing means, an outer tubular member formed with open ends, one of which is secured in the aperture of said fitting, an inner tubular member positioned inside of the outer member with the ends thereof extending beyond the ends of said outer tubular member, the tubular members being proportioned to provide an annular chamber between said outer and inner tubular members, a fluid pressure passage formed in said fitting extending from the exterior thereof and opening into the interior of said annular chamber, sealing means positioned within said fitting and said outer tubular member sealing the ends of said annular chamber, a closure means on one end of said inner tubular member, an orifice in the wall of said inner tubular member forming a passage from said annular chamber into the interior of said inner tubular member, a rotatable fluid tight fitting provided with an aperture to receive the open end of said inner tubular member and a passage extending from the interior of said inner tubular member to the exterior of said rotatable fitting.

THOMAS C. HILL.
WILLIAM A. SCHMIDT.

REFERENCES CITED

The following references are of record in the file of this patent:

UNITED STATES PATENTS

| Number | Name | Date |
|---|---|---|
| 836,989 | Oliver | Nov. 27, 1906 |
| 2,246,565 | Abercrombie | June 24, 1941 |
| 2,286,566 | Norton | June 16, 1942 |
| 2,328,898 | Goff | Sept. 7, 1943 |
| 2,377,196 | Walley | May 29, 1945 |
| 2,417,249 | Griswold | Mar. 11, 1947 |